(12) United States Patent
Jones

(10) Patent No.: US 6,965,411 B1
(45) Date of Patent: Nov. 15, 2005

(54) REMOTE CAMERA POSITIONER

(76) Inventor: Richard A. Jones, 5676 Penfield Ave., Woodland Hills, CA (US) 91367

( * ) Notice: Subject to any disclaimer, the term of this patent is extended or adjusted under 35 U.S.C. 154(b) by 0 days.

(21) Appl. No.: 09/339,430

(22) Filed: Jun. 24, 1999

(51) Int. Cl.[7] .......................... H04N 5/225; H04N 9/47; B23Q 15/00
(52) U.S. Cl. ..................... 348/373; 348/81; 348/124; 144/382; 144/4.1
(58) Field of Search ........................... 348/81, 61, 124, 348/125, 373; 144/4.1, 34.1, 34.5, 335, 336, 144/337, 338, 339, 382

(56) References Cited

U.S. PATENT DOCUMENTS

| | | | | |
|---|---|---|---|---|
| 3,757,042 A | * | 9/1973 | Funk | 348/81 |
| 4,425,298 A | * | 1/1984 | Shields | 348/81 |
| 4,502,407 A | * | 3/1985 | Stevens | 348/81 |
| 4,648,782 A | * | 3/1987 | Kraft | 414/735 |
| 5,316,412 A | * | 5/1994 | Sondergard | 348/81 |
| 5,678,091 A | * | 10/1997 | Daspit | 348/81 |
| 6,024,145 A | * | 2/2000 | Ackles | 144/382 |
| 6,793,415 B2 | * | 9/2004 | Arbuckle | 396/427 |

* cited by examiner

Primary Examiner—James J. Groody
Assistant Examiner—Lin Ye
(74) Attorney, Agent, or Firm—Elliott N. Kramsky

(57) ABSTRACT

Apparatus for remotely controlling the positioner of a camera head. At least one hydraulically-actuated positioner for rotating the camera head with respect to an axis is fixed to the camera head and to a camera support device, such as a camera boom. The positioner includes an output shaft whose angular displacement is responsive to fluid flows transmitted through a pair of associated hydraulic lines. A valve is associated with each positioner and controls the flow of fluid within the pair of positioner hydraulic lines. A control unit receives and processes inputs provided by a camera operator (observing the camera's field-of-view on a monitor) and outputs generated by the system so that the necessary adjustments may be controlled by the valves to assume smooth camera movements in either an aquatic environment or otherwise.

16 Claims, 8 Drawing Sheets

REMOTE CAMERA POSITIONER

BACKGROUND

1. Field of the Invention

The present invention relates to apparatus for remotely controlling the attitude of a television camera. More particularly, this invention pertains to apparatus suitable for the remote positioning of a film or video camera in an underwater environment.

2. Description of the Prior Art

Underwater motion imaging, both film and video, is substantially complicated by an inhospitable environment. The pointing or positioning of a camera underwater is subject to both significant drag and fluid infiltration forces.

While some attempts have been made to devise apparatus capable of remotely positioning a camera underwater, they have been limited to apparatus capable of dipping a camera housing a few inches beneath the surface, then tilting the lens above the surface. Such apparatus is not completely submersible. A few drops of water in the wrong place can render it inoperable.

As a result, underwater film and video photography presently relies upon the deployment of an underwater cameraman to point an often-bulky camera (75 pounds is not uncommon) manually. Thus, present-day underwater photography is skilled, labor-intensive and cannot realize the advantages of remote operation, which permits the cameraman to give his complete concentration to the images being captured, that are commonly utilized in above-surface photography.

SUMMARY OF THE INVENTION

The present invention addresses the preceding and other shortcomings of the prior art by providing apparatus for remotely controlling the position of a camera head. Such apparatus includes at least one hydraulically-actuated positioner having an output shaft. The angular displacement of the output shaft is responsive to fluid flow transmitted through a pair of lines coupled thereto. Means are provided for coupling the camera head to the positioner so that the attitude of the camera head is responsive to angular displacement of the output shaft. A valve is associated with the positioner. The valve is coupled to the pair of lines for controlling fluid flow. A hydraulic unit provides fluid under predetermined pressure to the valve. Means are provided for selectively energizing the valve to determine the fluid flows.

The preceding and other features and advantages of the present invention will become further apparent from the detailed description that follows. Such description as accompanied by a set of drawing figures. Numerals of the drawing figures, corresponding to those of the written description, point to the various features of the invention. Like numerals refer the like features throughout both the written description and the drawing figures.

DETAILED DESCRIPTION OF THE PREFERRED EMBODIMENT

Figure 1:
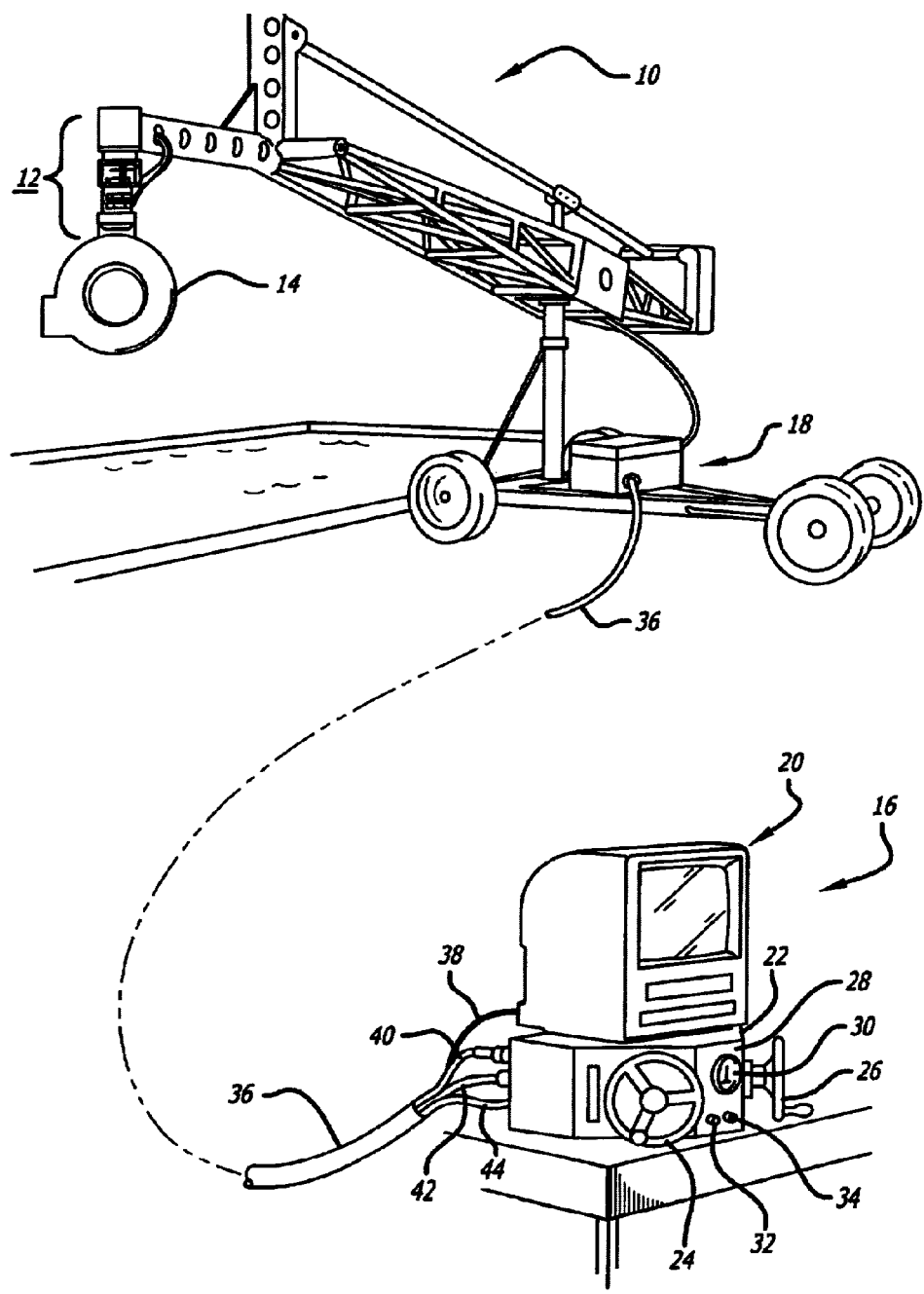
FIG. 1 is an overall pictorial view of the invention.

Turning to the drawings, FIG. 1 is a perspective view of the overall invention. As shown, the apparatus of the invention is mounted to a mobile counterbalanced boom 10 of a type that is conventionally employed to position a film or video camera.

The invention comprises a positioning structure 12 engaged to the distal end of the boom 10. Such structure 12 is provided for supporting and pointing a camera (not shown) that is housed within a conventional watertight camera cover 14.

The positioning structure 12 is hydraulically actuated and responsive to both hydraulic and electrical signals that are input at the command of a control unit 16. A hydraulic unit 18 houses apparatus for pumping and storing fluid under pressure.

Referring back to the control unit 16, a video monitor 20 provides the operator with a real time view of the camera output. A control box 22, upon which the monitor 20 is seated, includes hydraulic control wheels 24 and 26 for adjusting the attitude of the camera with respect to vertical ("pan") and horizontal ("tilt") axes, respectively. The front panel 28 of the control box 22 includes a gauge 30 that indicates the hydraulic pressure within the system, an on-off button 32 and manual override button 34. Communication between the hydraulic unit 18 and the control unit 16 is obtained by means of a flexible hose-like casing 36 that encloses a video cable 38, electrical-cables (only two of which are visible at 40, 42), and a hydraulic line 44. The functions responsive to the various signals and pressures transmitted by means of the casing 18 will become further apparent from the discussion that follows. The camera enclosed with the cone 14 may be of either the video or film tape. It is well-recognized in the art that cameras of both types are arranged to provide an output of the camera's filed of view, suitable for display upon the monitor 20.

Figure 2:
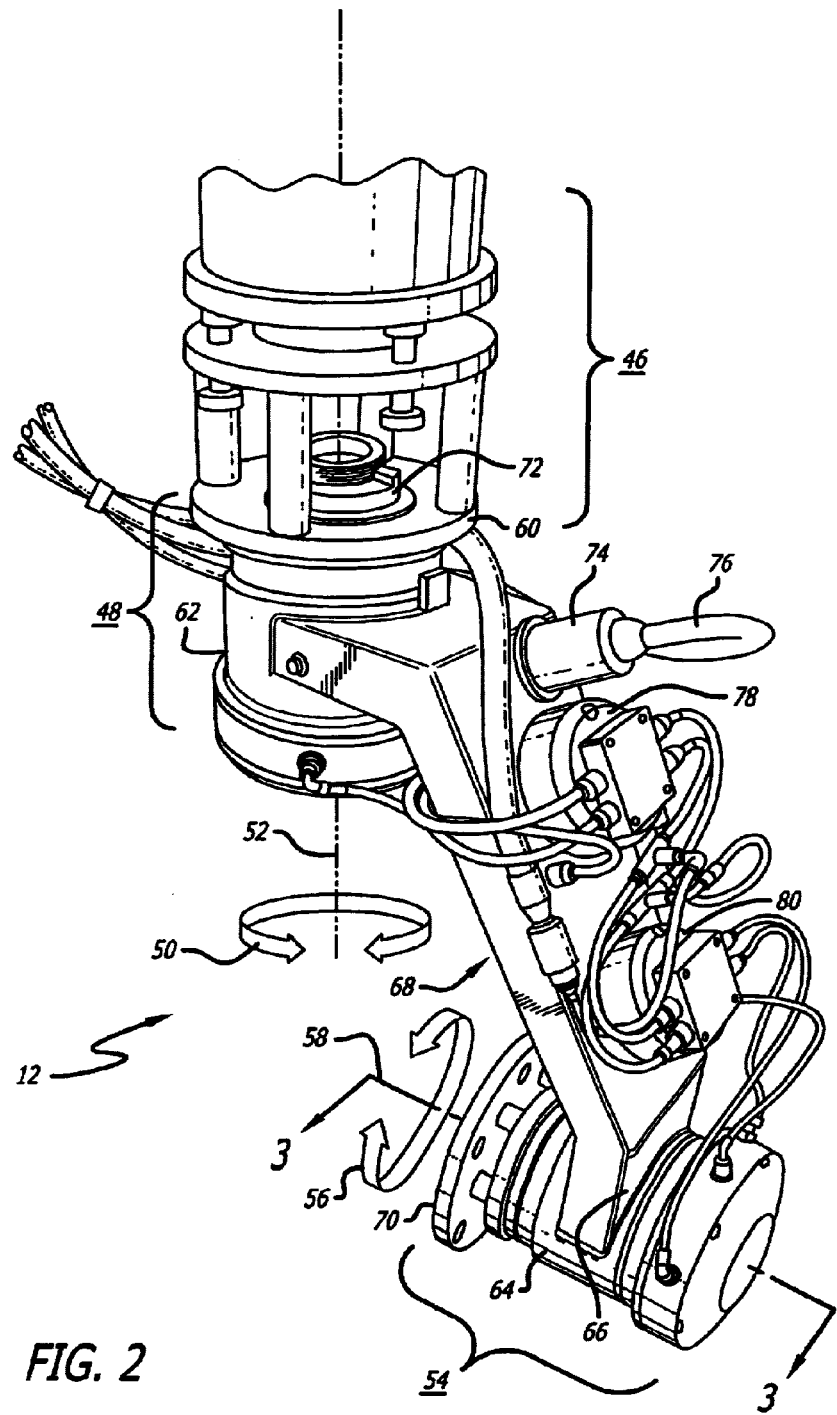
FIG. 2 is an enlarged perspective view of the positioning unit of the invention.

FIG. 2 is an enlarged perspective view of the camera positioning structure 12. As mentioned above, the structure 12 is fixed to and supported at the distal end 44 of the counterbalanced boom 10 by means of a boom support 46. It consists of an upper hydraulic positioner 48 for rotating the attached camera in offered directions (indicated by a two-headed arrow 50) about a vertical axis 52 and a lower hydraulic positioner 54 for rotating the attached camera (indicated by a two-headed arrow 56) about the tilt axis 58. Each of the positioners 48, 54 is of a similar arrangement. The system of the invention employs no belts, chains, gears, sprockets, or other devices readily subject to damage. It will be seen that, within the hydraulic positioners, an actuator is coupled directly from an output shaft to a main shaft. In this way, the threaded main output shaft of the positioner acts as a primary support member as well as a means for attachment to a boom or other structure.

Referring to the upper positioner 48, it is seen to include a mounting plate 60 fixed to the boom support 46. It will be appreciated that the outer body 62 of the positioner 48 is rotatable. In contrast, the corresponding outer body 64 of the lower positioner 54, welded to the lower end 66 of a generally-inclined bracket 68, is fixed in position while an associated mounting plate 70 is rotatable. Also visible in FIG. 2 are a nut 72 that secures the mechanism of the upper positioner 48, a connector 74 for receiving an electrical cable 76, and servo valves 78 and 80 associated with the upper and lower positioners 48 and 54 respectively.

Figure 3:
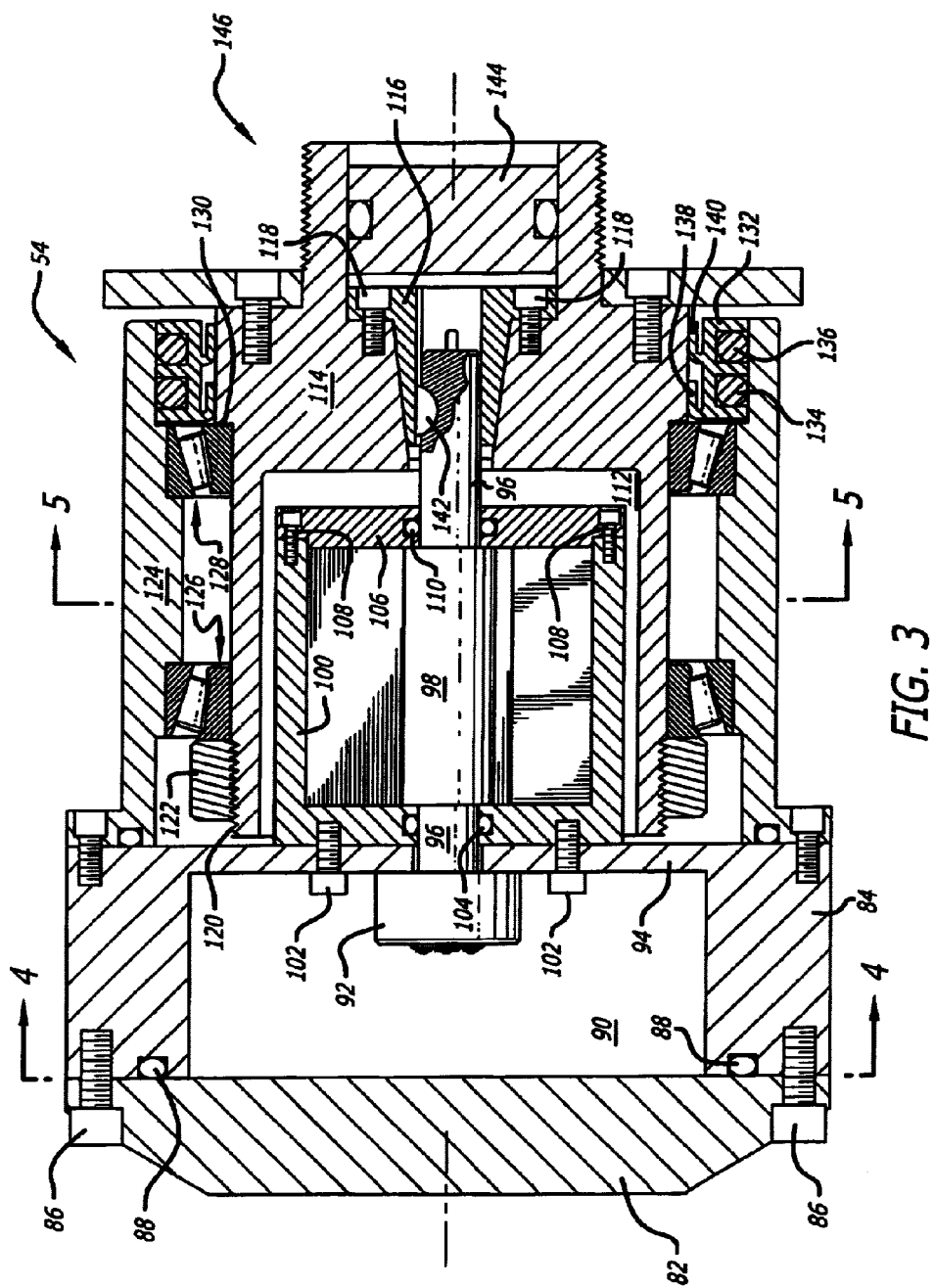
FIG. 3 is a cross-sectional view of the lower positioner of the invention taken at line 3—3 of FIG. 2.

FIG. 3 is a cross-sectional view of the lower positioner 54 taken at line 3—3 of FIG. 2. As mentioned above, the lower positioner 54 is substantially identical to the upper positioner 48, although the mounting plate 60 is fixed to the non-rotatable support structure 46 of the boom 10 while the mounting plate 70 secures the camera. The position of the plate 60 is fixed with respect to the rotatable outer body of the upper positioner 48 while the plate 70 is rotatable with respect to the angularly-fixed outer body of the lower positioner 54.

Each of the positioners 48 and 54 is hydraulically activated to overcome the resistance force encountered by a submerged camera. By utilizing hydraulic, rather than electric power, to position and reposition the camera remotely within an aquatic environment, the invention is free of failure modes that have characterized electrically-actuated remote camera devices. The strong resistance offered against a submerged camera can result in the overheating and burning of coils and the like. Furthermore, the designs of the positioners 48 and 54 will be seen to incorporate sealing structures for protecting enclosed mechanisms against fluid infiltration. The latter problem may become particularly acute when operating at significant depths.

It will be seen that each positioner is direct drive, driven by a rotary actuator with a one-to-one drive ratio. It would require a much larger electric motor to operate with the same power as a hydraulic motor. In addition, an electric motor would be subject to controllability problems when moving a load from a dead stop. Such a limitation is particularly unsuitable for camera movement where fluidity of movement is essential.

Proceeding from the left-hand side in FIG. 3, an end plate 82 is fixed to a spacer 84 by means of bolts 86 and such connection is sealed by means of an o-ring 88. The recessed interior of the spacer 84 creates an internal sealed cavity 90 for receiving hydraulic lines and electrical cables for controlling and actuating the positioner 54. Such cables and hydraulic lines are not shown in FIG. 3 for purposes of clarity, but are illustrated in the figure that follows. A potentiometer 92 is mounted to a wall 94 of the cavity 90 and fixed to an end of a shaft 96 for providing an electrical signal indicative of its angular displacement. Displacement of the shaft 96 is controlled by means including a rotary actuator section 98 thereof. The actuator section 98 is sealably contained within a cylindrical casing that includes a cup-shaped member 100. The member 100 is fixed to the spacer 84 by means of bolts 102 and sealed to the shaft 96 by an o-ring 104. An end plate 106 is fixed to the cup-shaped member 100 by bolts 108 and sealably fixed to the rotatable shift 96 by an o-ring 110. The cylindrical housing is, in turn, received within a cavity 112, formed at one end of a cylindrical inner body 114 that serves as the main output shaft of the positioner.

The generally-cylindrical inner body 114, which includes a threaded portion 120, receives a tapered collet 116 (secured by bolts 118) at the end opposite the threaded portion 120. The tapered collet 116 eliminates any backlash that may result between the actuator shaft 96 and the rotatable cylindrical inner body 114. It is threaded and engaged to an annular jamb nut 122 for securing it to the surrounding outer body 124 via an abutting rear tapered bearing race 126. Proceeding to the front of the inner body 114, a front tapered bearing race 128 is seated between an inner shoulder of the outer body 64 and an annular shoulder 130 of the body 114. A double-wiper seal 132 prevents leakage between the inner body 114 and the outer body 124. Infiltration through a path adjacent the interior wall of the outer body 124 is prevented by a pair of o-rings 134, 136, while outwardly-projecting wipers 138, 140 of the seal 132 are directed toward the front of the positioner 54 to prevent infiltration adjacent the exterior surface of the rotatable inner body 114.

The seal 132 is of the double-lipped type with sealing wipers directed forwardly in the assembled positioner so that the potentially-infiltrating liquid will itself exert a sealing pressure that acts against the surface of the shaft 114. Such a seal is characterized by a relatively-low coefficient of friction that makes it particularly suitable for oscillation and low r.p.m. applications.

A Woodruff key 142 fixes the inner body 114 to the shaft 96 for rotation of the inner body 114 is rotatable therewith and relative to the surrounding outer body 124. A stainless steel plug 144 is press-fit within a protruding neck 146 formed of the inner body 114. The exterior of the protruding neck 146 is threaded for receiving a nut (not shown) to secure the mounting plate 70 (also not shown in this figure).

Figure 4:
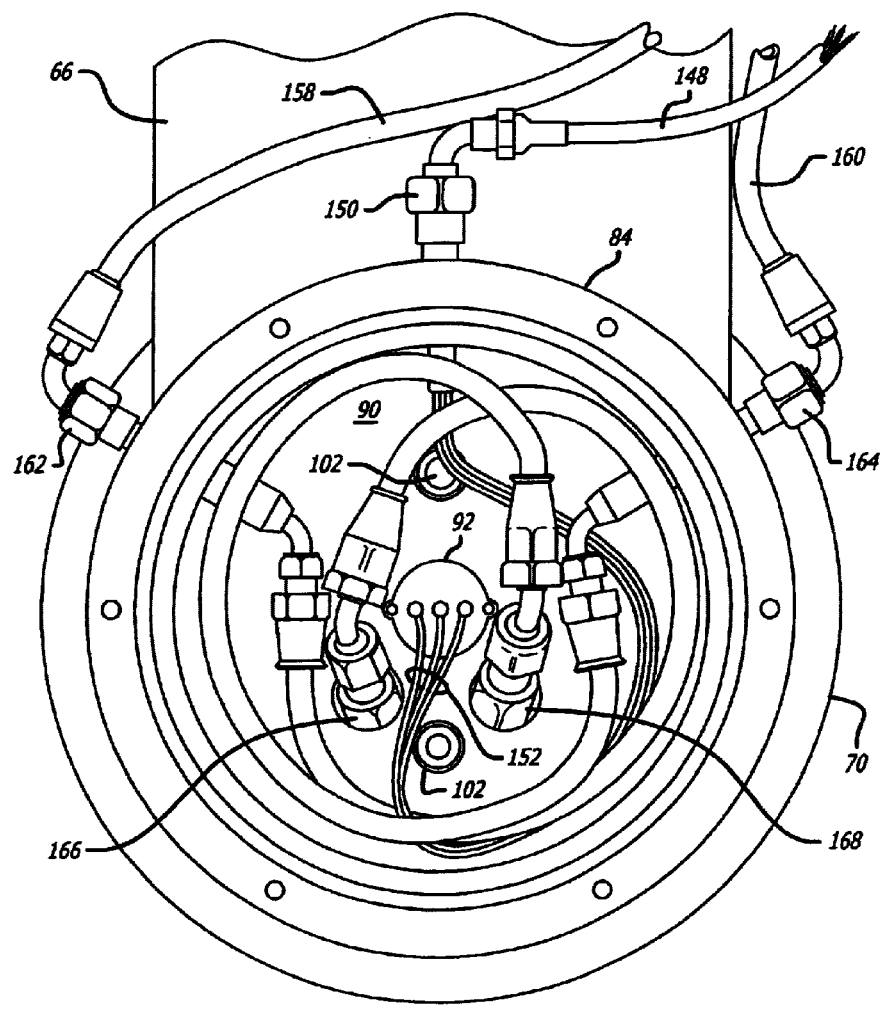
FIG. 4 is a cross-sectional view taken at line 4—4 of FIG. 3 for illustrating the routing of connections of the various electrical cables and hydraulic lines.

FIG. 4 is a cross-sectional view taken on line 4—4 of FIG. 3 for illustrating the paths of the various hydraulic and electrical connections to the positioner 54. As mentioned earlier, the various electrical conduits and hydraulic lines are deleted from FIG. 3 for purposes of clarity. In general, such elements are received within the cavity 90 formed by the spacer 84. An electrical cable 148, which communicates with the interior of the cavity 90 through a fitting 150, carries a set of three wires 152 to the terminals of the potentiometer 92. As mentioned earlier, the potentiometer 92 provides an electrical output indicative of the angular displacement of the shaft 96. This information is communicated through the wires 152 and the cable 148 to the control unit 16. Hydraulic lines 158 and 160 communicate through fittings 162 and 164, respectively, with the interior of the cavity 90 and through fittings 166 and 168. Such fittings 166, 168 penetrate the end wall 94 of the spacer 84 to provide access to chambers within the casing of the actuator. The angular position of the shaft 96 is hydraulically controlled by the filling and emptying of such chambers, discussed below.

Figure 5:
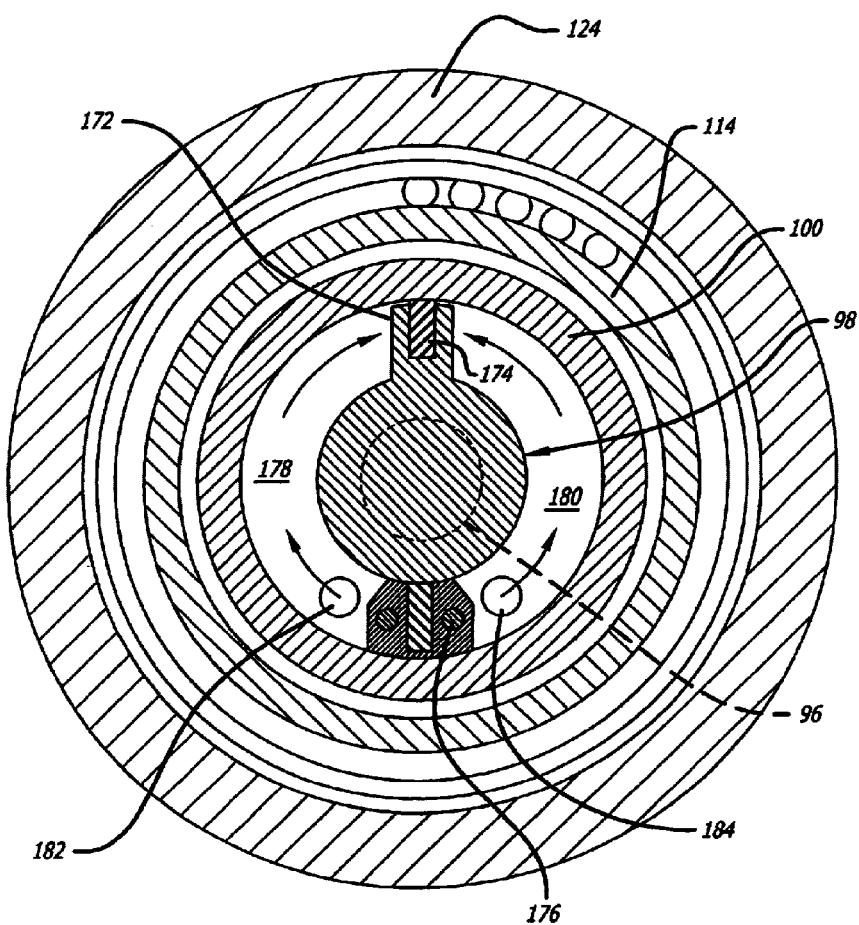
FIG. 5 is a cross-sectional view of the lower positioner taken at line 5—5 of FIG. 3 for illustrating the operation of the actuator.

FIG. 5 is a cross-sectional view of the lower positioner taken at line 5—5 of FIG. 3 for illustrating the operation of the actuator. As can be seen, the shaft section 98 includes a single radial fin 172 that projects toward the inner surface of the cup-shaped member 100. An elastomeric wiper 174 is seated within an internal longitudinal groove that projects the length of the shaft section 98 to contact the inner surface of the cup-shaped member 100. An inwardly-protruding pedestal 176 of the member 100 includes an arcuate top surface for contacting the cylindrical central sleeve 170. In combination, the wiper 174 and the pedestal 176, which includes an elongated central seal 177 of, for example, TEFLON, define separate chambers 178 and 180 within the interior of the cup-shaped body 100. Apertures 182 and 184 within the end wall of the cup-shaped body 100 (aligned with the fittings 168 and 166 within the mating end wall 94 of the spacer 84) provide inlet ports for controlled flows of hydraulic end wall 94 of the spacer 84) provide inlet ports for controlled flows of hydraulic fluid that selectively effectuate clockwise and counter-clockwise actuator 98 rotations and corresponding rotations of the shaft 96.

Figure 6:
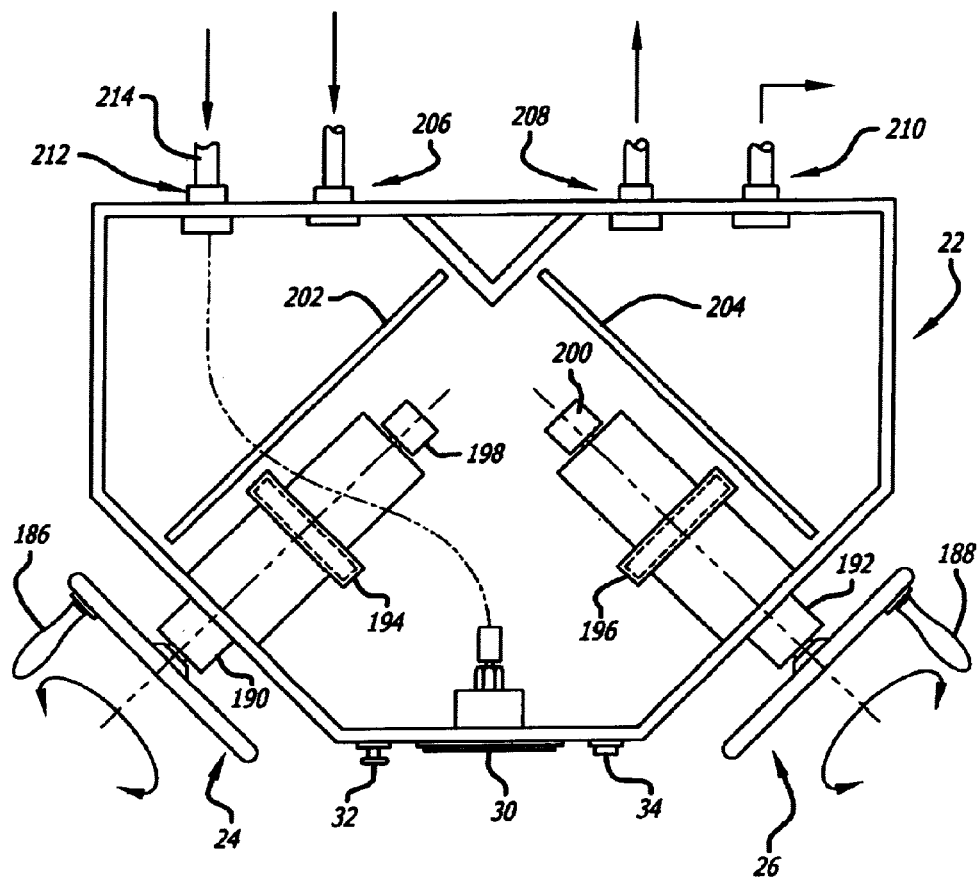
FIG. 6 is top planar view of the control console of the invention with top panel removed to facilitate viewing.

FIG. 6 is a top planar view of the control box 22 of the invention with top panel removed to facilitate viewing. The box 22 provides the camera operator, viewing the video monitor 20, with a means for inputting signals for responsively controlling the position of the camera 14. As mentioned earlier, control wheels 24 and 26, which may be grasped at handles 186 and 188 respectively, are fixed to shafts 190 and 192 that protrude within the box 22 as shown. Angular displacements of the shafts 190 and 192 are smoothed by the inertia provided by flywheels 194 and 196 respectively.

Potentiometers 198 and 200 at the ends of the shafts 190 and 192 generate electrical signals in response to rotation of the control wheels 24 and 26. Such signals serve as inputs that are applied to circuit boards 202 and 204, each of which includes an integrated circuit controller of the type marketed by H. R. Textron under Model No. EC250GP. Such a device is a single channel servo control card for driving servo valves in a closed-loop hydraulic or pneumatic position control system and is equipped with provisions for feedback from two different sensors, such as a position sensor and a force sensor. Such a card may be appropriately configured by one skilled in the art to perform the functions necessitated by the operation of the system herein and with particular reference to the discussion that accompanies FIG. 7 below.

Ports 206, 208 and 210 admit electrical conduit that communicate signals between the box 22 and external transducers, potentiometers and servo valves. A port 212 receives a hydraulic line 214 that originates at an accumulator (discussed below). Such hydraulic input is applied to the rear of the pressure gauge 30 to allow the camera operator to ascertain the pressure within the system. A manual override input allows the operator to adjust appropriate parameters (e.g. gain) of the integrated controller circuits of the circuit boards 202 and 204 to vary the responsiveness of the system to operator input (via the control wheels 24 and 26).

Figure 7:
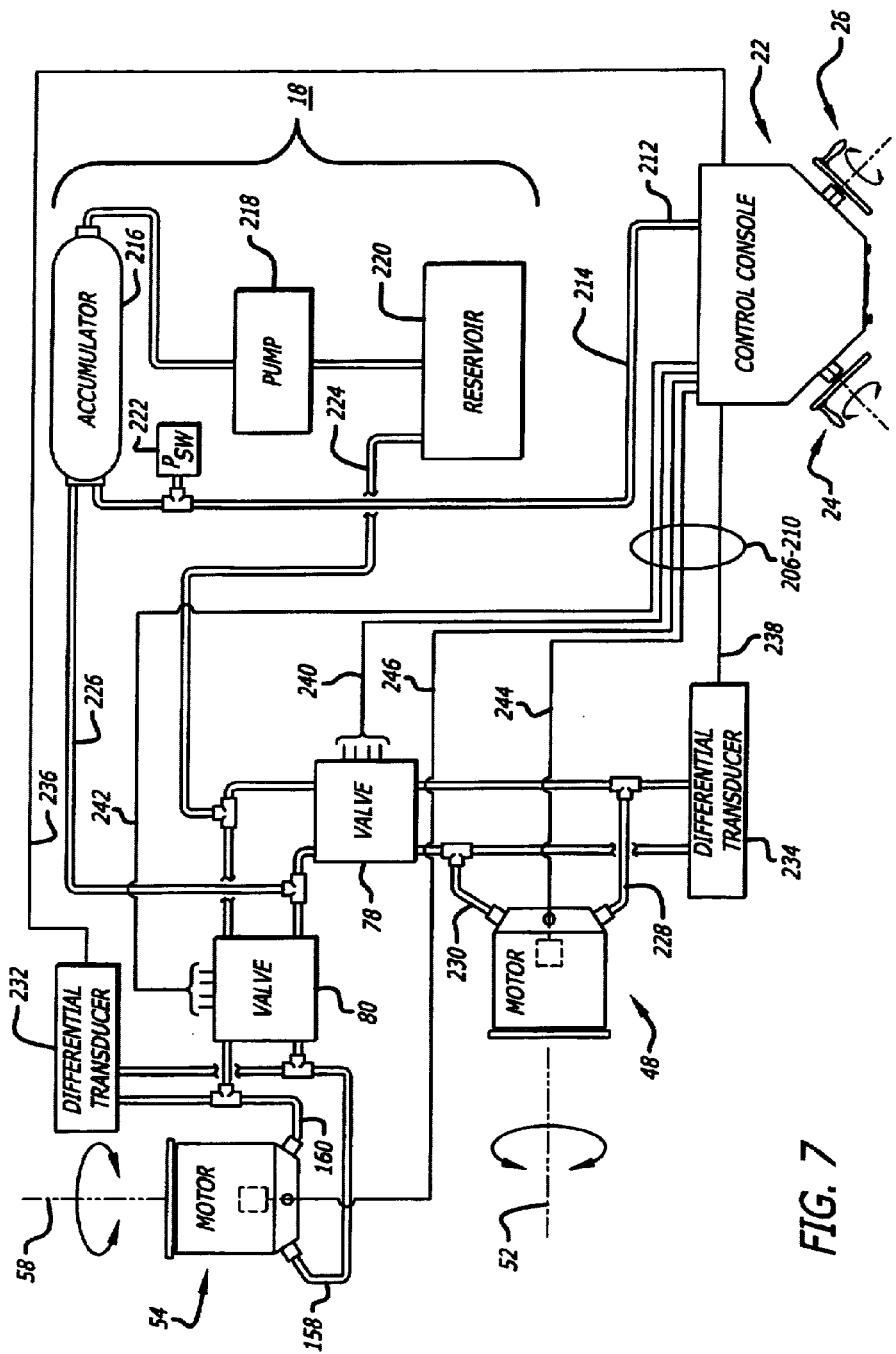
FIG. 7 is an overall schematic diagram of the electrical and hydraulic circuit elements of the invention.

FIG. 7 is an overall schematic diagram of the invention. The various elements of the hydro-electromechanical system cooperate to enable the camera operator to control the attitude of the camera from a remote location with respect to the pan and tilt axes 52 and 54. The hydraulic powered movements enable the apparatus to overcome underwater resistance forces without an overheating of electrical elements. From the discussion of the prior figure, electronics mounted upon printed circuit boards 202 and 204 receive, among other inputs, electrical signals (provided by potentiometers 198 and 200) responsive to the angular positions of the control handles 24 and 26. Other inputs to the electronics mounted upon the boards 202 and 204 will be disclosed below. The various elements of the system enable a camera to be positioned in a smoothly controllable manner, despite the presence of strong underwater resistance forces. Such smooth positioning of the camera is essential to the generation of high-quality film and video images.

The hydraulic unit 18 provides a pressurized output of hydraulic fluid for driving the positioners 48 and 54. Such unit 18 includes an accumulator 216 for maintaining constant system pressure which receives hydraulic fluid under pressure from a pump 218 that is supplied by a reservoir 220. The reservoir 220 receives unpressurized hydraulic fluid, through a return line 224, from the valves 78 and 80. As mentioned earlier, the output (pressure) from the accumulator 216 is monitored by the camera operator through observation of the gauge 30 of the control box 22. A pressure switch 222 taps the accumulator output line 214 and, in response to changes in the monitored pressure, generates an electrical signal for adjusting the operating pressure range of the pump 218 accordingly. Thus, the pump 218, the accumulator 216, and the pressure switch 222 form, in combination, a closed-loop system or regulating system pressure.

While the invention as disclosed in its presently preferred embodiment is driven by hydraulic pressure, it is suitable for direct conversion to a pneumatically-driven system. Such conversion involves the incorporation of a closed-loop system for regulating air, as opposed to hydraulic, system pressure. The design of such a system is entirely analogous to the hydraulic system described in the preceding paragraph subject to obvious modifications apparent to those skilled in the art.

Pressurized hydraulic fluid is directed to servo valves 78 and 80 associated with the positioners 48 and 54 respectively. As mentioned earlier, each valve and associated positioner is mounted to the distal end 46 of the boom 10. The servo valves 78 and 80 are each coupled to paired output lines for feeding (and draining) interior chambers of its associated rotary actuator as is illustrated in FIG. 5. It is such valve-directed filling and draining of the paired chambers that generates the hydraulic force for applying torque to the shaft of the positioner. Lines from the servo valves 78 and 80 are coupled to the return line 224. Such lines transport fluid from chambers to the side of the radial actuator fin from where fluid is being drained during actuator shaft rotation.

The actuator chambers of the positioner 54 are fed by the servo valve 80 through the hydraulic lines 158 and 160 while those of the actuator of the positioner 48 are fed by the servo valve 78 through hydraulic lines 228 and 230. The outputs of the valves 80 and 78 are applied to differential transducers 232 and 234 that provide electrical signals to the control box 22 through conductors 236 and 238 respectively. Such signals comprise additional inputs to the single channel control cards of the circuit boards 202 and 204. Qualitatively, these inputs are employed by the pressure loop of the device to regulate system pressure and thereby smooth the positioning movements of the camera. The outputs of the transducers 232 and 234 indicate the magnitude of the difference between the opposed forces that act within the chambers of the rotary actuators. A differential that exceeds a predetermined value will produce either jerky camera movements or locking of the main shaft of the positioner. Upon detection of such an unacceptably-large differential, the single channel control card will generate appropriate signals (transmitted to the servo valves 78 and 80 through the conductors 240 and 242 respectively) to reduce the pressure differential. This will slow the rate of rotation of the positioner shaft, but does not limit the degree of angular displacement. Compliant operation is triggered when an extremely high pressure differential is detected.

The electrical conductors 244 and 246 transmit the angular displacements of the rotary actuator and main shafts of the positioners (taken from the potentiometers mounted thereto), to the control cards within the control box 22. Such signals are applied to the position loop of the card (along with signals from the potentiometers 198 and 200 that are responsive to the angular positioners of the control wheels 24 and 26). In the event that a discrepancy is detected between the signals representing desired (i.e. control wheel) and actual (i.e. main and rotary actuator shaft positioners)

angular positions of the shafts, appropriate corrective signals will be sent to the servo valves 78 and 80 through the conductors 240 and 242.

Figure 8:
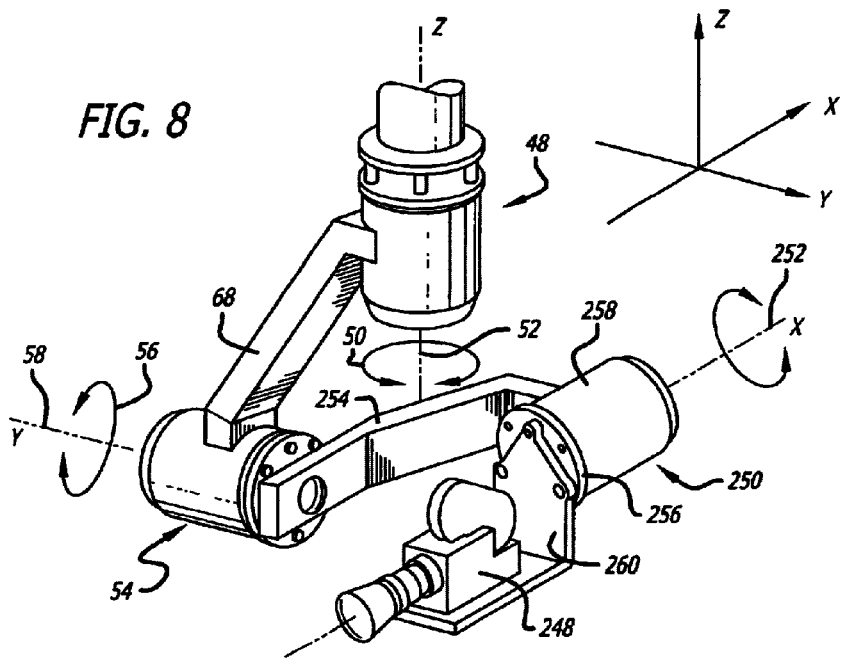
FIG. 8 is a perspective view of an alternative embodiment of the invention wherein the attitude of the camera is adjustable with respect to three axes.

FIG. 8 is a perspective view of an alternative embodiment of the invention, wherein the attitude of a camera 248 is adjustable with respect to three, rather than two, axes. Comparing the arrangement of FIG. 8 to the prior embodiment (wherein like numerals refer to corresponding elements of the prior embodiment), a third positioner 250 is fixed, by means of an L-shaped bracket 254, to the positioner 54 for pointing the camera 248 with respect to the tilt axis 58. As before, the positioner 54 is coupled, by means of a bracket 68, to the positioner 48 for pointing the camera 248 with respect to the pan axis 52. The positioner 250 is substantially identical to each of the positioners 48 and 54 discussed above. (Cabling has been removed from FIG. 8 for purposes of clarity.) A mounting plate 256 is rotatable with respect to its fixed outer body 258. The mounting plate 256, in turn, is fixed to a camera holder 260. Although not illustrated in FIG. 8, the camera 248 will, of course, be mounted within a watertight cover for underwater use.

In essence, the arrangement of FIG. 8 more-or-less mimics the action of an arm providing three degrees of rotational freedom. Thus, the camera 48 can be controllably rotated with respect to the pan axis 52, rotated with respect to the tilt axis 58, and rotated with respect to the roll axis 252. The mechanisms for accommodating the third degree of freedom offered by the invention are obtained through straightforward extension of the teachings pertaining to the prior embodiment and such adaptations will be apparent to those skilled in the art. It is to be noted that other arrangements than those illustrated in FIG. 8 may be provided for a three degrees of rotational movement apparatus. It is not necessary that the pan positioner 48, the tilt positioner 54, and roll positioner 50 be arranged in the particular relationship as illustrated. Rather, it is only necessary that a structure incorporating, for example, brackets as illustrated in FIG. 8, be provided with rotatable platforms that are sequentially coupled to provide, at some point, a resultant platform for mounting a camera that is responsive to rotation about each of the three chosen axes.

Figure 9:
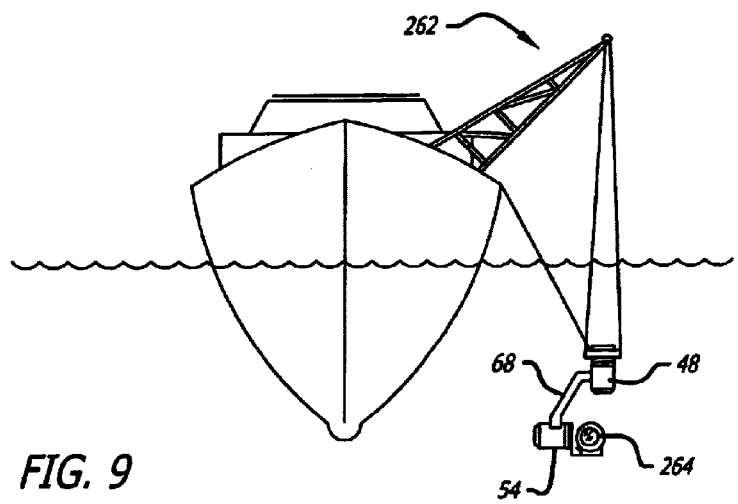
FIG. 9 is a conceptual view of the invention employed for underwater photography while suspended from a ship's boom.

FIG. 9 is a conceptual view of the invention employed for underwater photography while suspended from a ship's boom 262. The camera 264 may be aimed by means of the pan positioner 48 and the tilt positioner 54 in like manner to that described with reference to a mechanism suspended from a conventional camera boom. Like applications may be envisioned including, for example, the use of the apparatus of the invention for aiming a camera suspended within a deep shaft.

Thus, it is seen that the present invention provides apparatus for positioning a camera within an underwater environment. By utilizing the teachings of this invention, one may remotely control and position a camera underwater. The internal design of the positioners of the invention makes the device self-sealing to eliminate any need for bulky structures to prevent fluid infiltration. As illustrated, this invention is suitable for use in a number of environments and subject to a number of deployments.

The positioner is a sealed unit impervious to dust, water, mud, and hazardous chemicals, permitting the apparatus to be employed in a hazardous environment. Unlike machines that lack a hydraulic drive, the present invention is suitable for overcoming external forces, such as the high friction of water or a windstorm. Unlike prior art apparatus that is not waterproof, by employing apparatus in accordance with the invention, the camera operator is not limited to use of the device in favorable environments. Rather, unlike relatively-delicate devices, one may employ this apparatus in close proximity to an explosion. A camera operator could begin a scene in the water (e.g. thirty feet below the surface) and boom the camera out of the water while maintaining control of the camera both in and out of the water.

While this invention has been described with reference to its presently-preferred embodiment, it is not limited thereto. Rather, this invention is limited only insofar as it is defined by the following set of patent claims and includes within its scope all equivalents thereof.

What is claimed is:

1. Apparatus for remotely tilting and panning a camera head fixed to a boom, said apparatus comprising, in combination:
   a) a first and a second pressure-actuated positioner, each of said positioners including an elongated, output shaft rotatable with respect to an outer housing;
   b) said shafts of said positioners being vertically and orthogonally disposed with respect to one another by means of a bracket having one end fixed to the outer housing of said first positioner and an opposed end fixed to the outer housing of said second positioner so that said output shafts define orthogonal tilt and pan axes;
   c) means for directly coupling said output shaft of said first positioner to said boom so that said outer housing of said positioner and bracket rotate through a pan angle in response to rotation of said output shaft of said first positioner relative to said outer housing; and
   d) means for directly coupling said output shaft of said second positioner to said camera head so that said camera head rotates through a tilt angle in response to rotation of said output shaft of said second positioner and rotates through said pan angle in response to rotation of said outer housing of said first positioner.

2. Apparatus as defined in claim 1 wherein each of said positioners additionally comprises:
   a) the angular rotation of each of said output shafts being responsive to fluid flows transmitted through a pair of lines coupled thereto;
   b) a valve associated with each of said positioners, each of said valves being coupled to pair of lines for controlling said fluid flows;
   c) a hydraulic unit for providing fluid under predetermined pressure to each of said valves; and
   d) means for selectively energizing each of said valves to determine said fluid flows.

3. Apparatus as defined in claim 1 wherein each of said positioners additionally comprises:
   a) the angular rotation of each of said output shafts being responsive to air flows transmitted through a pair of lines coupled thereto;
   b) a valve associated with each of said positioners, each of said valves being coupled to pair of lines for controlling said air flows;
   c) a pneumatic unit for providing air under predetermined pressure to each of said valves; and
   d) means for selectively energizing each of said valves to determine said air flows.

4. Apparatus as defined in claim 2 wherein each of said positioners further includes:
   a) a rotational actuator having an actuator shaft;
   b) the angular rotation of said actuator shaft being directly responsive to said fluid flows;

c) a generally-cylindrical inner housing, said inner housing having an internal cavity for accommodating said rotational actuator;

d) the axis of symmetry of said generally-cylindrical inner housing being coincident with that of said actuator shaft;

e) said inner housing including a cylindrical main shaft position of reduced diameter at one end thereof;

f) means for fixing said actuator shaft to said inner housing whereby rotation of said inner housing generates corresponding rotation of said main shaft.

5. Apparatus as defined in claim 4 wherein each of said positioners further includes:

a) said outer housing being generally cylindrical;

b) said generally-cylindrical outer housing having a hollow interior for accommodating said inner housing; and c) means for rotatably coupling said inner housing to said outer housing.

6. Apparatus as defined in claim 4 wherein said rotational actuator further includes:

a) a substantially-hollow cylindrical body with an axially-elongated pedestal protruding inwardly and contacting said actuator shaft;

b) an axially-elongated radially-directed fin fixed to said actuator shaft and extending to the inner surface of said substantially-hollow cylindrical body whereby the interior of said cylindrical body comprises two chambers;

c) a wall at one end of said rotational actuator having two apertures, each of said apertures being in communication with one of said chambers; and d) one of said lines being in communication with one of said apertures and the other line being in communication with the other of said apertures.

7. Apparatus as defined in claim 4 wherein said cylindrical main shaft portion is exteriorly-threaded.

8. Apparatus as defined in claim 5 further including a contacting annular seal between the interior of said outer housing and the exterior of said inner housing.

9. Apparatus as defined in claim 8 wherein said seal further includes:

a) a pair of outwardly-directed wipers; and b) said wipers are axially aligned adjacent said outer surface of said inner housing.

10. Apparatus as defined in claim 5 further including a pair of contacting, axially-aligned annular bearing races between the interior of said outer housing and the exterior of said inner housing.

11. Apparatus as defined in claim 10 wherein each of said bearing races houses a tapered bearing.

12. Apparatus as defined in claim 4 wherein said means for fixing said actuator shaft to said inner housing further comprises:

a) a tapered collet, said collet surrounding and being coaxial with said actuator shaft;

b) means for fixing said collet to said inner housing; and c) means for fixing said tapered collet to said actuator shaft.

13. Apparatus as defined in claim 12 wherein said means for fixing said tapered collet to said actuator shaft comprises an inwardly-directed key extending from the interior of said collet to a groove within the exterior of said actuator shaft.

14. Apparatus as defined in claim 4 further including:

a) the interior of said main shaft position being substantially hollow;

b) a substantially-cylindrical plug, said plug being received within said hollow interior of said main shaft; and c) means for sealing said plug to said main shaft.

15. Apparatus as defined in claim 14 wherein said means for sealing comprises:

a) an o-ring; and b) said o-ring being received within an annular groove within the outer surface of said plug.

16. Apparatus as defined in claim 7 further including:

a) a mounting structure;

b) said mounting structure including a substantially-planar plate having an internal aperture for accommodating said cylindrical main shaft; and c) an interiorly-threaded nut for securing said plate to said main shaft whereby said mounting structure is rotatable with said main shaft.

* * * * *